US008112876B2

(12) United States Patent
Xie et al.

(10) Patent No.: US 8,112,876 B2

(45) Date of Patent: Feb. 14, 2012

(54) METHOD OF COMPRESSING A CONNECTOR

(75) Inventors: Mayue Xie, Phoenix, AZ (US); Shawn M. Chawgo, Cicero, NY (US); Noah P. Montena, Syracuse, NY (US)

(73) Assignee: John Mezzalingua Associates, Inc., East Syracuse, NY (US)

( * ) Notice: Subject to any disclaimer, the term of this patent is extended or adjusted under 35 U.S.C. 154(b) by 0 days.

(21) Appl. No.: 12/917,099

(22) Filed: Nov. 1, 2010

(65) Prior Publication Data

US 2011/0041326 A1 Feb. 24, 2011

Related U.S. Application Data

(62) Division of application No. 11/056,685, filed on Feb. 11, 2005, now Pat. No. 7,823,271.

(51) Int. Cl.
*B23P 19/00* (2006.01)
*B21D 39/04* (2006.01)

(52) U.S. Cl. ................ 29/751; 29/758; 29/237; 29/874; 72/409.16; 72/416

(58) Field of Classification Search .................... 29/751, 29/758, 868, 237, 268; 72/416, 409.16
See application file for complete search history.

(56) References Cited

U.S. PATENT DOCUMENTS

| | | | | |
|---|---|---|---|---|
| 3,175,281 | A | | 3/1965 | Elfsten |
| 3,325,885 | A | | 6/1967 | Ziegler, Jr. et al. |
| 3,571,894 | A | | 3/1971 | Bilka |
| 3,732,718 | A | | 5/1973 | Barberio et al. |
| 3,845,538 | A | | 11/1974 | Demler, Sr. |
| 4,467,512 | A | * | 8/1984 | Modes ............................ 29/237 |
| 4,571,808 | A | * | 2/1986 | King ............................... 29/268 |
| 4,653,309 | A | | 3/1987 | Hendricks et al. |
| 4,932,091 | A | | 6/1990 | Krzyzanski |
| 5,335,531 | A | | 8/1994 | Mann et al. |
| 5,392,508 | A | | 2/1995 | Holliday et al. |
| 5,537,727 | A | | 7/1996 | Mayer |
| 5,647,119 | A | | 7/1997 | Bourbeau et al. |
| 5,845,393 | A | | 12/1998 | DePaiva |
| 5,879,191 | A | | 3/1999 | Burris |
| 5,941,120 | A | | 8/1999 | Jee |
| 6,253,449 | B1 | | 7/2001 | Chen |
| 6,272,738 | B1 | | 8/2001 | Holliday et al. |
| 6,708,396 | B2 | | 3/2004 | Holliday |
| 7,823,271 | B2 | | 11/2010 | Xie et al. |
| 2003/0177586 | A1 | | 9/2003 | Chen |
| 2004/0110416 | A1 | | 6/2004 | Montena et al. |
| 2011/0041327 | A1 | | 2/2011 | Xie et al. |

OTHER PUBLICATIONS

Office Action (Mailed Date: May 17, 2011 for U.S. Appl. No. 12/917,153, filed Nov. 1, 2010.
U.S. Appl. No. 12/917,443, filed Nov. 1, 2010.

* cited by examiner

*Primary Examiner* — Minh Trinh
(74) *Attorney, Agent, or Firm* — Schmeiser Olsen & Watts

(57) ABSTRACT

A connector compression tool and associated method of compressing a connector is provided wherein the tool includes a handle, pivotally moveable from a second position to a first position, a body, configured to compress together when the handle is moved to the first position, and a jaw, operably associated with the body, wherein the jaw includes at least two centering openings having different widths to accommodate differently configured connectors having different diameters and different lengths.

9 Claims, 6 Drawing Sheets

METHOD OF COMPRESSING A CONNECTOR

CROSS-REFERENCE TO RELATED APPLICATIONS

This application is a divisional application claiming priority to U.S. application Ser. No. 11/056,685 filed on Feb. 11, 2005, now U.S. Pat. No. 7,823,271 issued on Nov. 2, 2010.

BACKGROUND OF INVENTION

1. Technical Field

This invention relates generally to the field of tools for connecting coaxial cable connectors to cable ends by compression. More particularly, this invention provides for a coaxial cable connector compression tool comprising a jaw configured to accommodate different sized connectors and a method of use thereof.

2. Related Art

Cable communications have become an increasingly prevalent form of electromagnetic information exchange and coaxial cables are common conduits for transmission of electromagnetic communications. Connectors for coaxial cables are typically connected onto cable ends to facilitate cable connection with complementary interface ports to electrically integrate coaxial cables to various electronic devices. Compression tools are useful in affixing the connectors to the cable ends because the tools provide increased mechanical advantage effective for securely compressing the connectors onto the cables.

There are many coaxial cable connector compression tools available for use in fastening coaxial cable connectors. Typically, connector compression tools can only accommodate one size of connector. In order to accommodate different sized connectors having different diameters and/or different lengths, typical connector compression tools include additional parts or components such as movable stops, flexible-hinged jaws, replaceable jaws and swiveling heads. Further, the tools often require springs, pivots, screws and other components to accommodate different sized connectors. These additional parts add complexity and cost to the connector compression tools.

Accordingly, there is a need in the field of coaxial cable connector compression tools for an improved tool design.

SUMMARY OF INVENTION

The present invention provides a connector compression tool for use with coaxial cable connectors that offers improved reliability.

A first general aspect of the invention provides a connector compression tool comprising a handle, pivotally moveable from a second position to a first position, a body, wherein the body includes a first body portion moveable with respect to a second body portion such that the first and second body portions may operatively compress together when the handle is maneuvered to a first position, and a jaw, operably associated with the body, wherein the jaw includes a plurality of openings having different widths to accommodate connectors having different diameters.

A second general aspect of the invention provides a connector compression tool comprising a body, a handle, pivotally operable with the body, and a pair of jaws, relatively moveable toward and away from each other as the handle is pivoted, wherein the jaws retain connectors having different diameters by engaging the connectors via slots having multiple widths.

A third general aspect of the invention provides a connector compression tool comprising a handle operating with a body, wherein the body compresses together as the handle is maneuvered to a first position, and a set of jaws, wherein the jaws are moveable with respect to each other as the body is compressed, wherein the jaws have a fixed geometry and are configured with means for accommodating differently configured connectors having different diameters and different lengths.

A fourth general aspect of the invention provides a method of compressing a connector, the method comprising providing a connector compression tool, wherein the connector compression tool includes a handle, pivotally moveable from a second position to a first position, a body, configured to compress together when the handle is moved to the first position; and a jaw, operably associated with the body, wherein the jaw includes at least two centering openings having different widths to accommodate connectors having different diameters. The method further comprises placing a connector with the provided connector compression tool such that surfaces of the connector operatively engage centering portions of the jaw and compressing the connector by maneuvering the handle from the second position to the first position.

The foregoing and other features of the invention will be apparent from the following more particular description of various embodiments of the invention.

BRIEF DESCRIPTION OF THE DRAWINGS

Some of the embodiments of this invention will be described in detail, with reference to the following figures, wherein like designations denote like members, wherein.

DETAILED DESCRIPTION OF THE INVENTION

Figure 1:
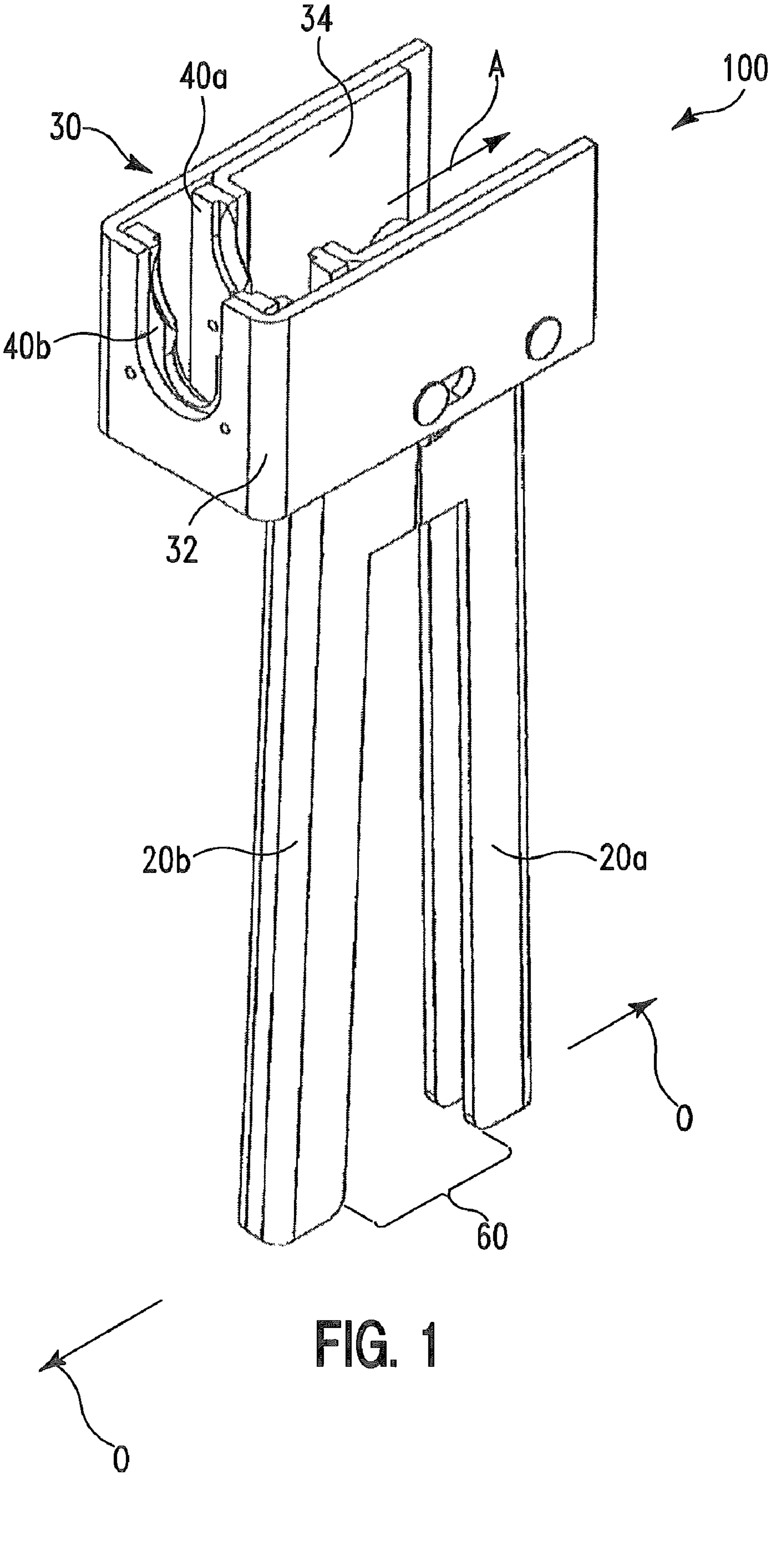
FIG. 1 depicts a perspective view of an embodiment of a connector compression tool, in accordance with the present invention.

Although certain embodiments of the present invention will be shown and described in detail, it should be understood that various changes and modifications may be made without departing from the scope of the appended claims. The scope of the present invention will in no way be limited to the number of constituting components, the materials thereof, the shapes thereof, the relative arrangement thereof, etc., and are disclosed simply as an example of an embodiment. The features and advantages of the present invention are illustrated in detail in the accompanying drawings, wherein like reference numerals refer to like elements throughout the drawings.

As a preface to the detailed description, it should be noted that, as used in this specification and the appended claims, the singular forms "a", "an" and "the" include plural referents, unless the context clearly dictates otherwise.

Referring to the drawings, FIG. 1 depicts an embodiment of a connector compression tool 100, in accordance with the present invention. The connector compression tool 100 may comprise a handle 20 (e.g. 20*a*, 20*b*) wherein the handle 20, such as handle 20*a*, may be pivotally moveable in a direction O from a first position 60 to a second position 70 (shown in FIG. 2). Additionally, the handle 20*a* may be pivotally operable with a body 30, such that pivotal operation of the handle 20*a* effectuates opening and closing of the body 30, wherein a first body portion 32 may be moveable with respect to a second body portion 34 such that the first body portion 32 and second body portion 34 of the body 30 may operatively compress together when the handle 20*a* is maneuvered to a first position 60. Moreover, when the handle 20*a* is moved from a first position 60 to a second position 70, the second body portion 34 may move in a direction A with respect to the first body portion 32. Furthermore, embodiments of the connector compression tool 100 may comprise a handle 20*b*. It should be recognized that the handle 20*b* may be pivotally fashioned with respect to the body 30, or may be operable with the body 30 such that the handle 20*b* remains pivotally static with respect to the body 30. However, the handle 20*b* should be pivotal with respect to handle 20*a* and vice versa so that the two handles 20*a-b* may be maneuvered, in a direction, O between a first position 60 and a second position 70 (shown in FIG. 2).

With further reference to FIG. 1, an embodiment of a connector compression tool 100 may comprise a jaw 40*a* being configured to hold a connector. The jaw 40*a* may have a fixed geometry which may include two or more centering slots or openings, wherein the openings have different widths. The different widths of the slots on jaw 40*a* may accommodate differently configured connectors (such as connector 80 and connector 90, shown in FIGS. 7 and 8 respectively) having different diameters. The geometry of the jaw 40*a* may be fixed so that the jaw 40*a* may not include additional parts or components such as movable stops, flexible-hinges, replaceable components, swiveling elements, springs, pivots, screws and other components to accommodate different sized connectors. Furthermore, the openings of jaw 40*a* may engage differently configured connectors via physical contact with the corresponding openings of jaw 40*a*. An embodiment of a connector compression tool 100 may further comprise a jaw 40*b*. The jaw 40*b* may work in conjunction with jaw 40*a* to facilitate compression of differently configured connectors. As such, the jaws 40*a-b* may act as a pair or set of holding devices comprising opposing parts of the connector compression tool 100 to hold and compress a connector. The pair of jaws 40*a-b* may be relatively moveable toward and away from each other as the handle 20*a* (and/or 20*b* depending on the embodied design) is pivoted to effectuate opening and closing of the first and second portions 32 and 34 body 30. Moreover, the set of jaws 40*a-b* may be moveable with respect to each other as the body 30 and its various portions 32 and 34 are compressed.

Figure 2:
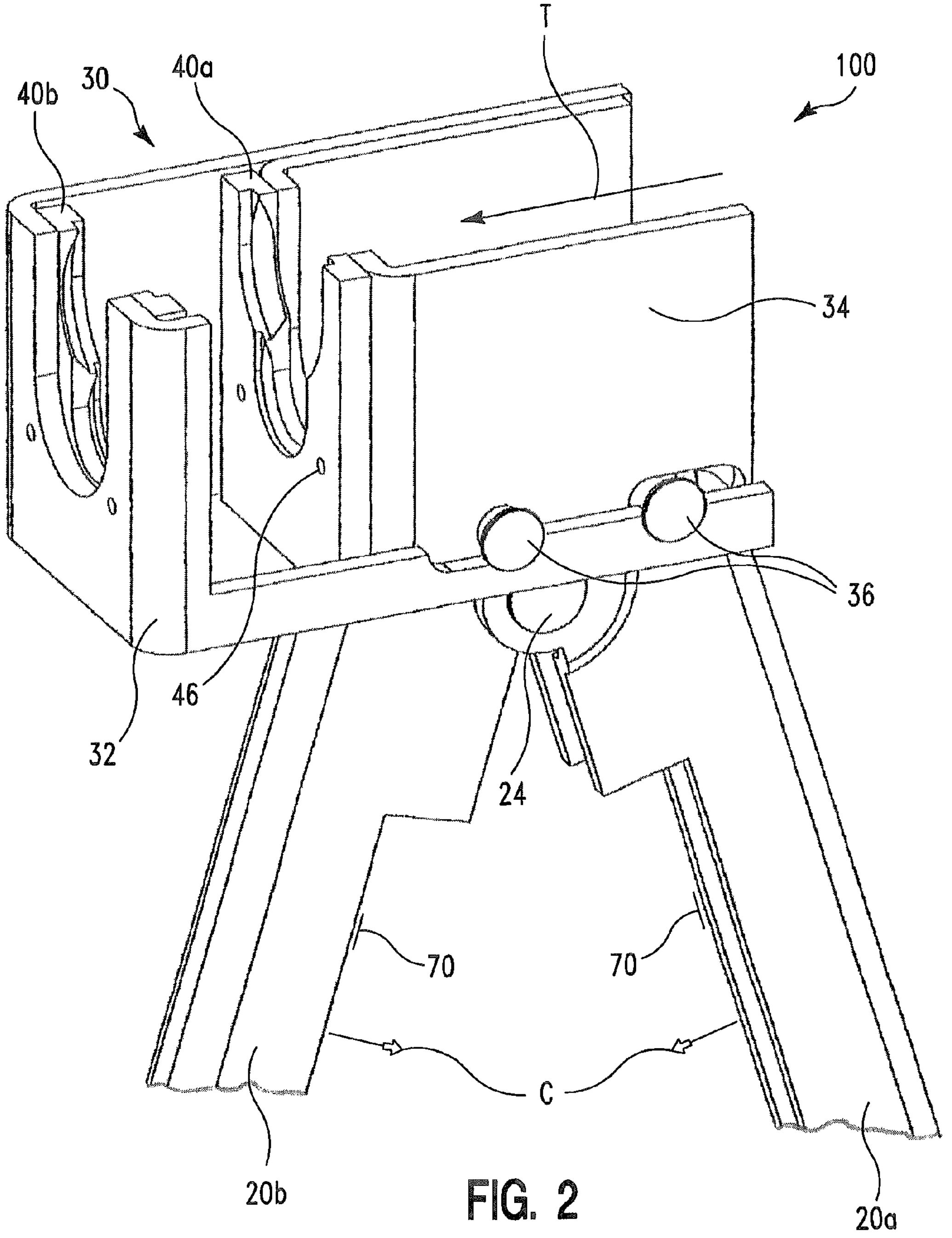
FIG. 2 depicts a partially cut-away perspective view of an embodiment of connector compression tool, in accordance with the present invention.

Referring further to the drawings, FIG. 2 depicts a partially cut-away perspective view of an embodiment of connector compression tool 100, in accordance with the present invention. Some of the first body portion 32 of the body 30 was partially cut-away to more clearly show various elements of the tool 100. As shown, handle 20*a* and handle 20*b* are pivotally spread apart in a second position 70. The handles 20*a-b* may rotate about a pivot 24 of or operable with the body 30. When the handles 20*a-b* are oriented in a second position 70 an operator may compress the body 30 by moving a rear second body portion 34 of the body 30 in a direction T toward a forward second body portion 32 of the body 30. Further, the second body portion 34 of the body 30 may operate with an attached, physically associated, joined, linked, and/or connected, jaw 40*a*. The jaw 40*a* may be connected to the second body portion 34 of the body 30 by a fastener 46 such as a bolt, screw or rivet, or may be fastened by welds, clips, geometrical sockets, or other positioning means. When operably positioned with the rear second body portion 34 of the body 30, the jaw 40*a* may receive a portion of a connector. Accordingly, the proximity of the rear portion 34 where the jaw 40*a* may be located may include a slot or opening configured to accommodate the largest sized connector capable of being accommodated by the jaw 40*a*. Furthermore, the first body portion 32 of the body 30 may operate with an attached jaw 40*b*. The jaw 40*b* may be positioned proximate the first body portion 32 of the body 30 by a fastener 46 or other fastening means similar to those used to position the jaw 40*a* with the second body portion 34 of the body 30. Moreover, the first body portion 32 of the body 30 may include a slot or opening configured to facilitate engagement of the jaw 40*b* with a connector when positioned with the first body portion 32 of the body 30 and accommodated by the jaw 40*b*.

With continued reference to FIG. 2, the connector 100 may operate such that pivotal contraction of the handles 20*a-b*, in a direction C, from a second position 70 to a first position 60 (shown in FIG. 1) works to maneuver jaw 40*a* operating with the rear second body portion 34 of the body 30 toward the opposing jaw 40*b* fashioned to the front first body portion 32 of the body 30. The contracting movement of the body 30 and its various body portions 32 and 34, operating with the handles 20*a-b*, may be directionally assisted by movable trunnions, guide posts, push stems, or positioning pegs 36. Furthermore, the several components of the connector compression tool 100 may be comprised of various materials useful in assisting the compression of an engaged connector (shown in FIGS. 7 and 8) by the tool 100 when the tool is moved to a first position 60 (shown in FIG. 1). For example the entire connector compression tool 100 may be comprised of metal. Moreover, the body 30 of the tool 100 may be formed of metal, while the handles 20*a-b* may be comprised of a rigid plastic material. In addition, the handles 20*a-b* be may be fashioned from wood and the body 30 may be formed of a sturdy composite material, while the pivot 24 or movable trunnions, guide posts, push stems, or positioning pegs 36 may be comprised of metal. It should be recognized by those skilled in the art that different embodiments of the connector compression tool 100 may incorporate various components formed of various materials suitable for effecting proper use and operant function of the tool in connecting, compressing, fastening, installing and engaging connectors configured with different sizes.

Figure 3:
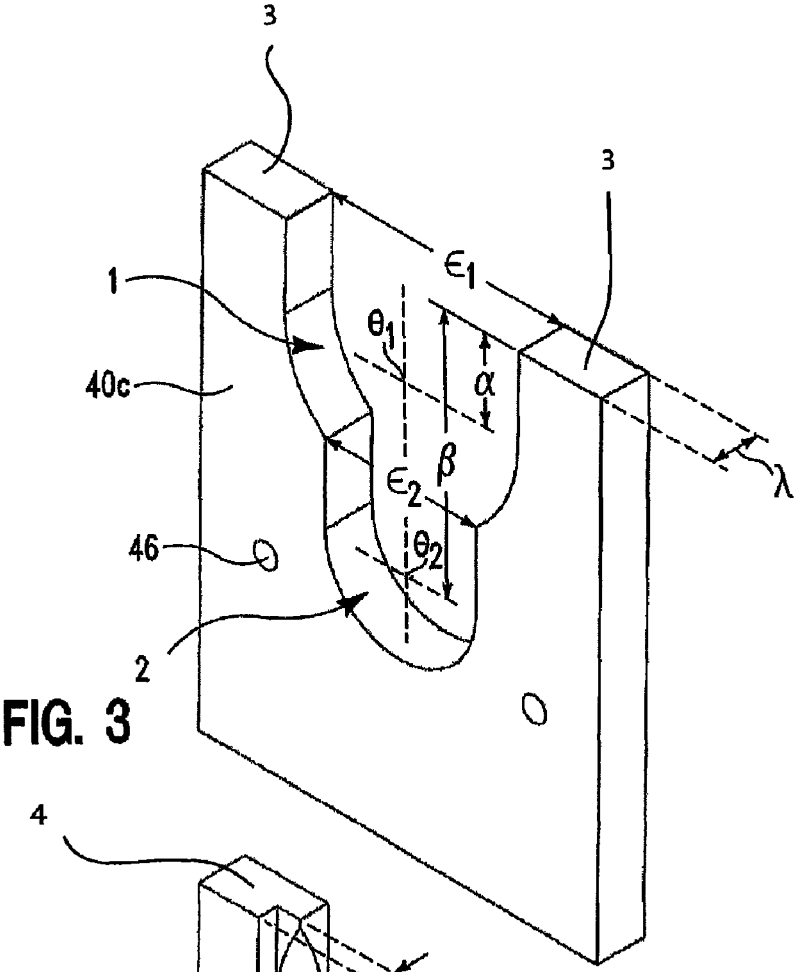
FIG. 3 depicts a perspective view of an embodiment of a slotted jaw, in accordance with the present invention.

With further reference to the drawings, FIG. 3 depicts a perspective view of an embodiment of a slotted jaw 40*c*, in accordance with the present invention. The slotted jaw 40*c* may have a thickness $\lambda$. Those in the art may recognize that the thickness may vary throughout the jaw 40*c* according to various desired jaw performance characteristics. Moreover, the slotted jaw 40*c* may have a slot or slots extending through the thickness $\lambda$ and being generally defined by dimensions $\theta_1$, $\theta_2$, $\epsilon_1$, $\epsilon_2$, $\alpha$ and $\beta$. The slot or slots extend from a single top 3 of the jaw 40*c*. The dimension $\theta_1$ may define the center of an opening 1 having a width $\epsilon_1$ and being positioned a distance $\alpha$ from the top of the slotted jaw 40*c*. The opening 1 may be geometrically compatible with a connector and may likewise accommodate the reception of the connector when oriented for compression by the connector compression tool 100 (see FIG. 1, see also generally FIG. 7). The dimension $\theta_2$ may define the center of an opening 2 having a width $\epsilon_2$ and being positioned a distance 13 from the top of the slotted jaw 40*c*. The opening 2 may be geometrically compatible with a connector that is smaller than the connector compatible with opening 1 and may likewise accommodate the reception of the smaller connector when the smaller connector is oriented for compression by the connector compression tool 100 (see FIG. 1, see also generally FIG. 8). The slotted jaw 40*c* may be comprised of metals, hard plastics, rigid composites and/or other materials suitable for durable use in compressing variably sized connectors. Furthermore, the slotted jaw 40*c* may be formed by molding, casting, stamping, forging, cutting, turning, milling, drilling and/or other like methods of formation and/or any combination thereof. In addition, the slotted jaw 40*c* may include tapped holes 46 or other like formations suitable for facilitating fastening of the slotted jaw 40*c* on the connector compression tool 100 (shown in FIG. 2).

Figure 4:
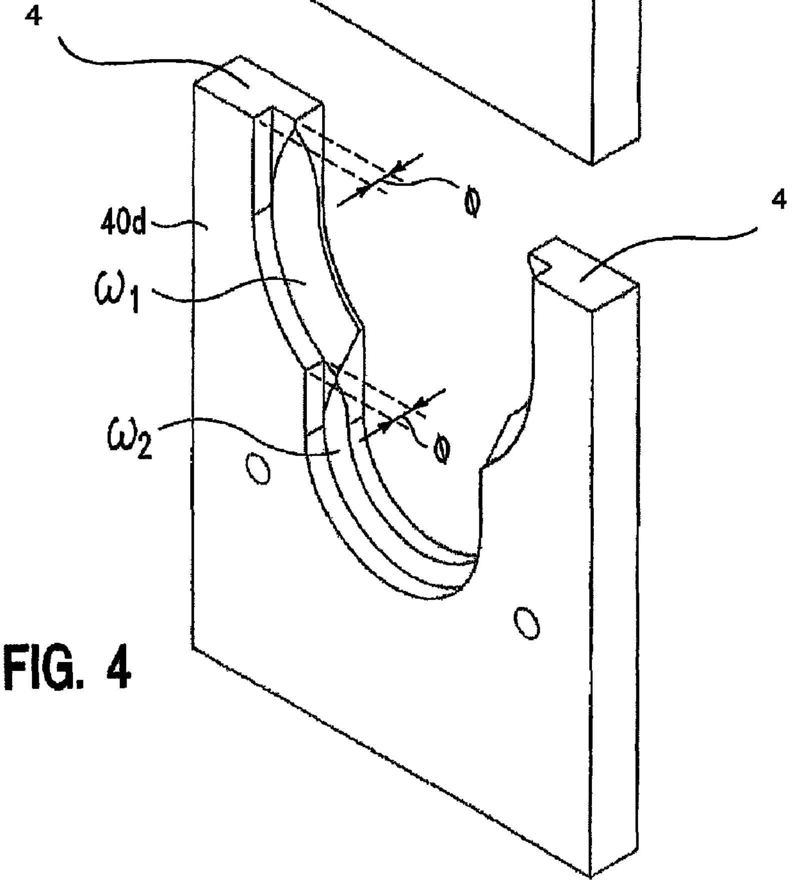
FIG. 4 depicts a perspective view of an embodiment of a jaw having slots of variable width countersunk at the same depth, in accordance with the present invention.

With still further reference to the drawings, FIG. 4 depicts a perspective view of an embodiment of a jaw 40*d* having slots of variable width countersunk at the same depth $\phi$, in accordance with the present invention. The jaw 40*d* may be similar to the slotted jaw 40*c* in that the jaw 40*d* may have a slot or slots being generally defined by dimensions such as $\theta_1$, $\theta_2$, $\epsilon_1$, $\epsilon_2$, $\alpha$ and $\beta$ (shown in FIG. 3). The slot or slots extend from a single top 4 of the jaw 40*d*. Accordingly, the jaw 40*d* may include features such as opening 1 and opening 2 facilitating the accommodation of connectors of variable size. However, the embodied jaw 40*d* may also include countersunk surfaces $\omega_1$ and $\omega_2$, wherein the countersunk surfaces $\omega_{1-2}$ both begin at a depth $\phi$ extending from an outer surface of the jaw 40*d*. The counter sunk surfaces $\omega_{1-2}$ may be centered respectively on centers such as centers $\theta_1$ and $\theta_2$ of openings 1 and 2 (shown in FIG. 3). Moreover, because each of the counter sunk surfaces $\omega_1$ and $\omega_2$ may be centered, the jaw 40*d* may act to center connectors accommodated by the slot or slots formed therein. Further, the centering may be accomplished where a connector having tapered edges may react with a counter sunk surface $\omega_1$ or $\omega_2$ to center the connector as it is compressed by the connector compression tool 100 (see generally, FIGS. 7-8).

Figure 5:
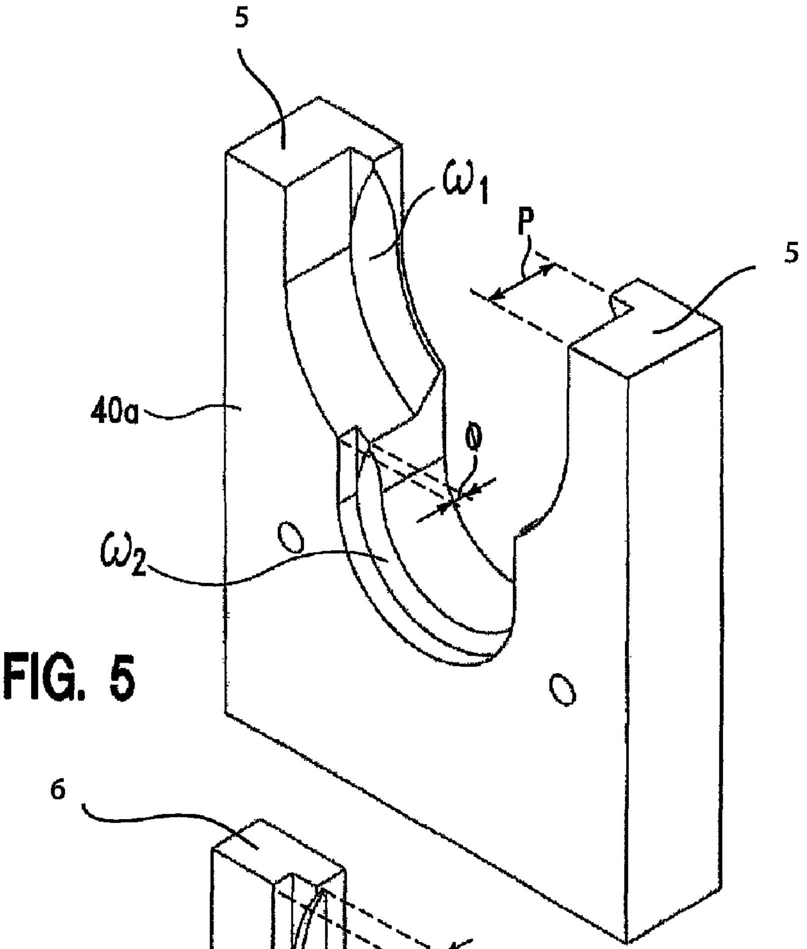
FIG. 5 depicts a perspective view of an embodiment of a jaw having slots of variable width countersunk at different depths, in accordance with the present invention.

Referring even further still to the drawings, FIG. 5 depicts a perspective view of an embodiment of a jaw 40*a* (shown also in FIGS. 1 and 2) having slots of variable width countersunk at different depths, in accordance with the present invention. The jaw 40*a* may be similar to the slotted jaw 40*c* in that the jaw 40*a* may have a slot or slots being generally defined by dimensions such as $\theta_1$, $\theta_2$, $\epsilon_1$, $\epsilon_2$, $\alpha$ and $\beta$ (shown in FIG. 3). The slot or slots extend from a single top 5 of the jaw 40*a*. Accordingly, the jaw 40*a* may include features such as opening 1 and opening 2 facilitating the accommodation of connectors of variable size. Moreover, the embodied jaw 40*a* may also may also be similar to jaw 40*d* (shown in FIG. 4) in that the jaw 40*a* may include countersunk surfaces $\omega_1$ and $\omega_2$. However, unlike the jaw 40*d*, the countersunk surfaces $\omega_{1-2}$ of jaw 40*a* may not both begin at a depth $\phi$ extending from an outer surface of the jaw 40*a*. Rather, the countersunk surface $\omega_1$ of jaw 40*a* may begin at a separate depth $\rho$ extending from an outer surface of the jaw 40*a*, while the countersunk surface $\omega_2$ of jaw 40*a* may begin at a depth $\phi$ extending from an outer surface of the jaw 40*a*. Those in the art should recognize that the respective depths $\rho$ and $\phi$ at which countersunk surfaces $\omega_{1-2}$ begin may vary in correlation with connectors of different sizes. Like the jaw 40*d*, the counter sunk surfaces $\omega_{1-2}$ of jaw 40*a* may be centered respectively on centers such as centers $\theta_1$ and $\theta_2$ of openings 1 and 2 (shown in FIG. 3). Moreover, because each of the counter sunk surfaces $\omega_1$ and $\omega_2$ may be centered, the jaw 40*a* may act to center connectors accommodated by the slot or slots formed therein. Further, the centering may be accomplished where connectors of different sizes having tapered edges may react with either of the counter sunk surfaces $\omega_1$ or $\omega_2$ to center the connectors as they are compressed by the connector compression tool 100 (see generally, FIGS. 7-8).

Figure 6:
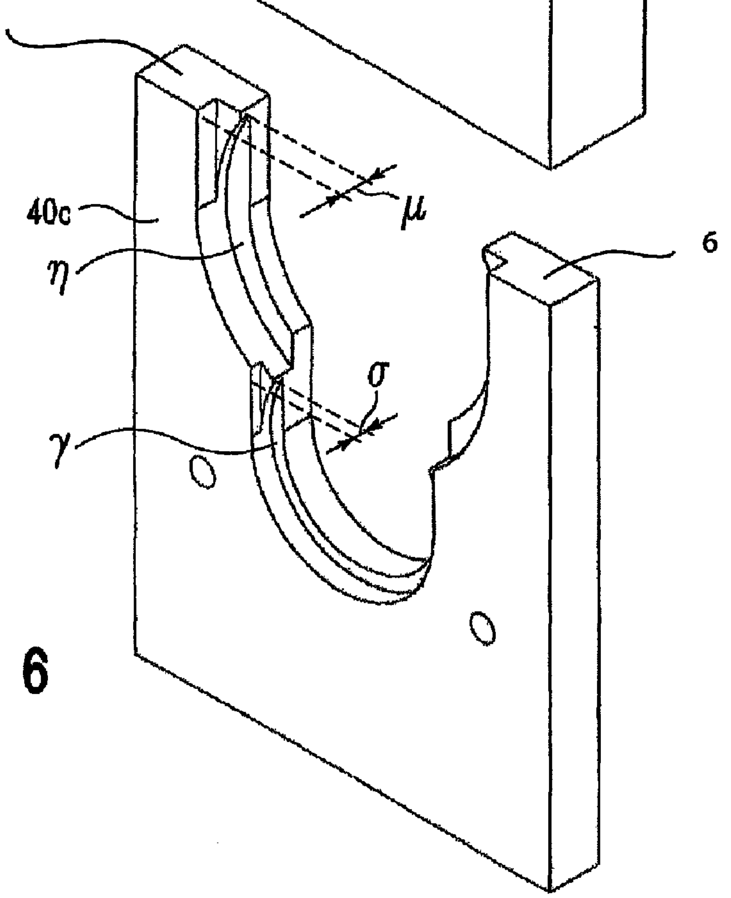
FIG. 6 depicts a perspective view of an embodiment of a jaw having slots of variable width counterbored at different depths, in accordance with the present invention.

With continued reference to the drawings, FIG. 6 depicts a perspective view of an embodiment of a jaw 40*e* having slots of variable width counterbored at different depths, in accordance with the present invention. The jaw 40*e* may be similar to the slotted jaw 40*c* in that the jaw 40*e* may have a slot or slots being generally defined by dimensions such as $\theta_1$, $\theta_2$, $\epsilon_1$, $\epsilon_2$, $\alpha$ and $\beta$ (shown in FIG. 3). The slot or slots extend from a single top 6 of the jaw 40*e*. Accordingly, the jaw 40*e* may include features such as opening 1 and opening 2 facilitating the accommodation of connectors of variable size. Moreover, the embodied jaw 40*e* may also may also be similar to jaw 40*a* (shown in FIG. 5) in that the jaw 40*e* may include surfaces $\eta$ and $\gamma$ such as $\omega_1$ and $\omega_2$ of jaw 40*a*, which may be centered respectively on centers such as centers $\theta_1$ and $\theta_2$ of openings 1 and 2 (shown in FIG. 3). Furthermore, like the countersunk surfaces surfaces $\omega_{1-2}$ of jaw 40*a* (shown in FIG. 5), which may begin at separate respective depths such as $\rho$ and $\phi$, the surfaces $\eta$ and $\gamma$ of jaw 40*e* may also begin at separate respective depths $\eta$ and $\gamma$ extending from an outer surface of the jaw 40*e*. However, unlike the countersunk surfaces $\omega_{1-2}$ of jaw 40*a*, the surfaces $\eta$ and $\gamma$ of jaw 40*e* may not be countersunk. Rather, the surfaces $\eta$ and $\gamma$ of jaw 40*e* may be counterbored. Because each of the counterbored surfaces $\eta$ and $\gamma$ of jaw 40*e* may positioned with respect to centers such as centers $\theta_1$ and $\theta_2$ of openings 1 and 2 (shown in FIG. 3), the jaw 40*e* may act to center connectors accommodated by the slot or slots formed therein. Further, the centering of connectors may be accomplished where connectors of different sizes having squared edges may react with either of the counterbored surfaces $\eta$ and $\gamma$ of jaw 40*e* to center the connectors as they are compressed by the connector compression tool 100 (see generally, FIGS. 7-8).

With reference to FIGS. 3-6, jaws 40*a*-*e* may be configured with means for accommodating differently configured connectors having different diameters and different lengths. The means may include the geometric design of the jaws 40*a*-*e*, in that the jaws 40*a*-*e* contain two slots of differing widths. The slots may correspond to opening 1 and opening 2 and the widths may correspond to $\epsilon_1$ and $\epsilon_2$. The differing widths allow two connector sizes of corresponding widths to be received by the jaws 40*a*-*e*. Moreover, the slots of jaws 40*a*-*e* may be recessed to differing depths. The variable depth recess of the slots facilitates the accommodation of connectors of differing lengths. Moreover, slots of the jaws 40*a*-*e* may be further augmented to contain centering depressions, such as countersunk surfaces $\omega_1$ and $\omega_2$ and/or counterbored surfaces $\eta$ and $\gamma$, wherein the centering depressions encompass more than 180° of the girth of a connector and center the connector as it is received with connector compression tool 100.

Figure 7:
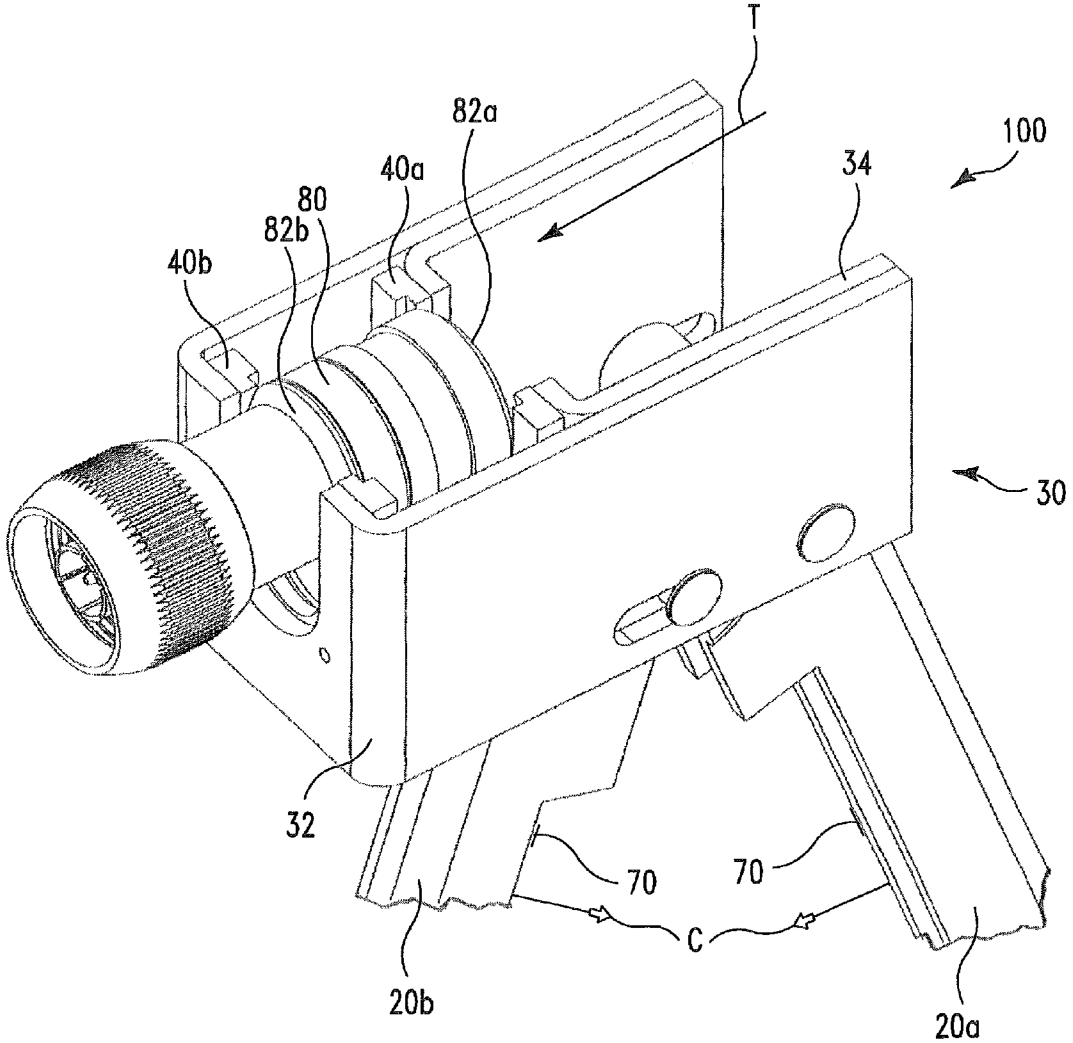
FIG. 7 depicts a perspective view of an embodiment of a connector compression tool accommodating a larger connector.
Figure 8:
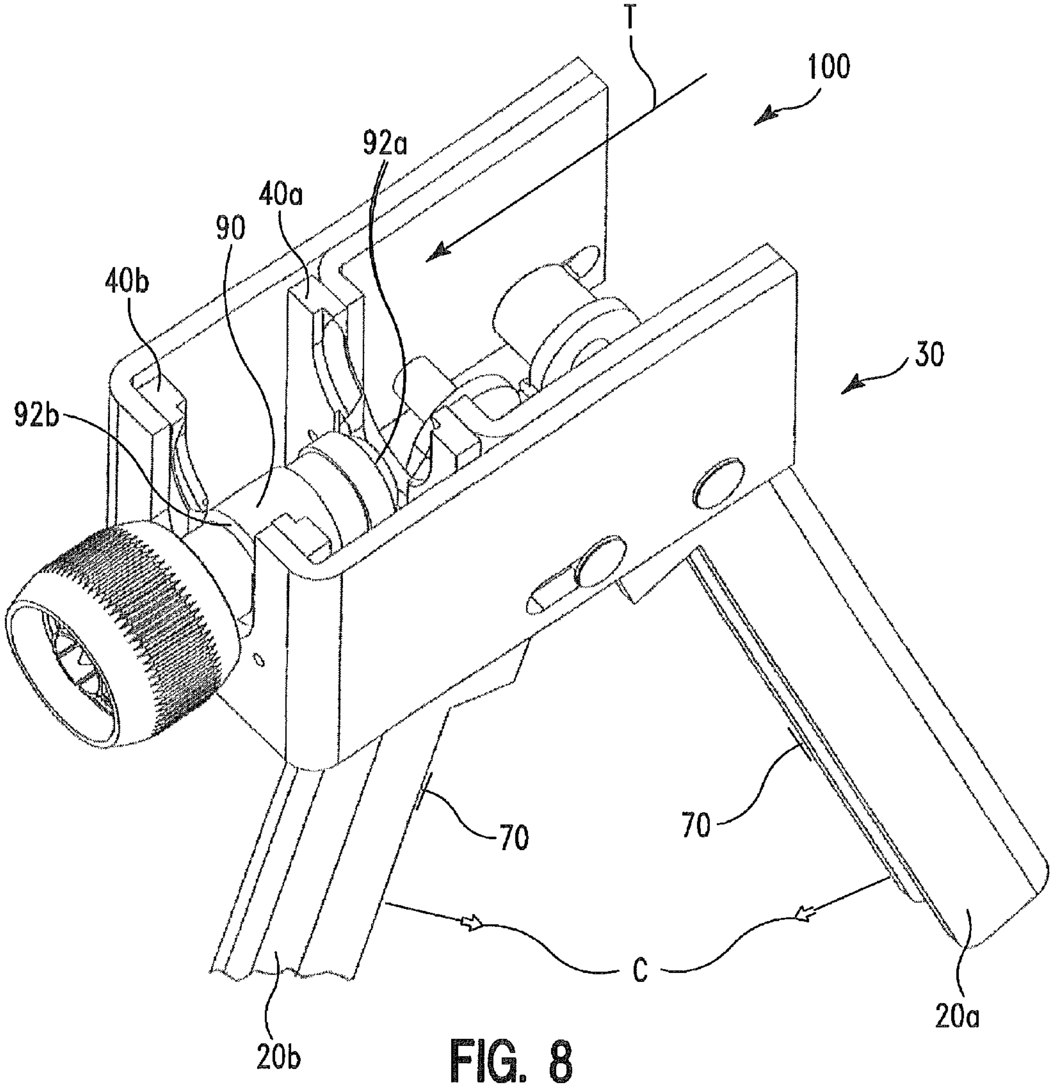
FIG. 8 depicts a perspective view of an embodiment of a connector compression tool accommodating a smaller connector.

Referring further to the drawings, FIGS. 7-8 respectively depict perspective views of an embodiment of a connector compression tool 100 accommodating differently sized connectors, such as connector 80 and connector 90. Specifically, FIG. 7 depicts an embodiment of a connector compression tool 100 configured to receive a connector 80. The connector 80 may include an outer surface having a larger diameter corresponding with widths and diameters of openings in jaws 40*a*-*b*, such as opening 1 (shown if FIG. 3). Further, connector 80 may have tapered edges 82*a* and 82*b* that may operate with countersunk surfaces of jaws 40*a*-*b*, such as countersunk surface $\omega_1$ (shown in FIG. 5). It should be appreciated that jaw 40*b* may be an component symmetrical with jaw 40*a* in that it is a substantially mirrored element oriented in a reciprocal manner with respect to the connector compression tool 100 such that it may effectively receive connector 80. However, other embodiments of connector compression tool 100 may include a jaw 40*b* that is not symmetrical with jaw 40*a* so as to accommodate corresponding other embodiments of connector 80 having differently configured surfaces of various sizes and shapes. For example, surface 82*b* of connector 80 may be a flat edge that operates with a counterbored surface of jaw 40*b*. When connector 80 is received and accommodated by connector compression tool 100, the handle 20 may be maneuvered, in a direction C, from a second position 70 to a first position 60 (shown in FIG. 1) thereby compressing the connector 80 within the body 30 as the connector is compressed between the second body portion 34 contractually moving, in a direction T, toward the first body portion 32. The connector 80 may be compressed such that portions of the connector 80 operably slide, move or squeeze together as the connector 80 is acted upon by the connector compression tool 100. Those skilled in the art should recognize that the centering depressions or openings formed in jaws 40*a*-*b* may encompass more than 180° of the connector 80 girth. Moreover, as the connector 80 is encompassed by the components of the connector compression tool 100, it may be retained during operation of the tool 100.

Referring specifically to FIG. 8 an embodiment of a connector compression tool 100 configured to receive a connector 90. The connector 90 may include an outer surface having a smaller diameter corresponding with openings in jaws 40*a*-*b*, such as opening 2 (shown if FIG. 3). Further, connector 90 may have tapered edges 92*a* and 92*b* that may operate with countersunk surfaces of jaws 40*a*-*b*, such as $\omega_2$ (shown in FIG. 5). The connector 90 may also be shorter in length than connector 80, and as such, the variance in the depth of recession of the slot or slots formed in jaws 40*a*-*b* (see FIG. 5) may facilitate efficient accommodation of the smaller connector 90. As received, the connector 90 may protrude through a slots or openings of the first and or second body portions 32 and/or 34 of the body 30. Moreover, connector 90 may be compressed within and by the body 30 when second body portions 34 is moved, in a direction T, as the handles 20*a* and 20*b* are operatively moved, in a direction C, from a second position 70 to a first position 60 (shown in FIG. 1). The connector 90 may be compressed such that portions of the connector 90 operably slide, move or squeeze together as the connector 90 is acted upon by the connector compression tool 100.

With continued reference to FIG. 8, and further reference to FIGS. 1,5 and 7, a method of compressing a connector is depicted. The method may comprise providing an embodiment of a connector compression tool 100, wherein the connector compression tool 100 includes a handle 20*a*, pivotally moveable from a second position 70 to a first position 60. The provided connector compression tool 100 may further include a body 30, configured to compress together when the handle 20*a* is moved to the first position 60. Moreover, the connector compression tool 100 may include a jaw 40*a*, operably associated with the body 30, wherein the jaw 40*a* includes at least two centering openings 1 and 2 having different widths to accommodate differently configured connectors, such as connectors 80 and 90, having different diameters. The method may further comprise placing a connector, such as connector 80 or 90, with the connector compression tool 100 such that the surfaces, such as surfaces 82*a*-*b* or surfaces 92*a*-*b*, of the connector 80 or 90, operatively engage centering portions of the jaw 40*a*. In addition, the method may include compressing the connector (such as connector 80 or connector 90) such that portions of the connector operably slide, move or squeeze together as the connector is acted upon by the connector compression tool 100 by maneuvering the handle 20*a* from the second position 70 to the first position 60.

While this invention has been described in conjunction with the specific embodiments outlined above, it is evident that many alternatives, modifications and variations will be apparent to those skilled in the art. Accordingly, the embodiments of the invention as set forth above are intended to be illustrative, not limiting. Various changes may be made without departing from the spirit and scope of the invention as defined in the following claims.

What is claimed is:

1. A method of compressing a connector, said method comprising:

- providing a connector compression tool, wherein the connector compression tool includes:
  - a handle, pivotally moveable between a first position to a second position;
  - a body, configured to compress together when the handle is moved to the first position; and
  - a jaw having a fixed geometry, the jaw operably associated with the body, wherein the jaw includes a single top and a plurality of adjoining openings extending from the top and having different widths and centering portions to accommodate and center connectors having different diameters, wherein each opening of the plurality of adjoining openings also extends through the entire thickness of the jaw, wherein a center of a first opening of the plurality of openings is located farther from the top of the jaw than a center of a second opening of the plurality of openings;
- placing a connector with the provided connector compression tool such that surfaces of the connector operatively engage centering portions of the jaw; and
- compressing the connector by maneuvering the handle from the second position to the first position.

2. The method of claim 1 wherein the compression connector tool further includes another jaw.

3. The method of claim 2, wherein both jaws function as a set and are moveable with respect to each other as the body is compressed.

4. The method of claim 2, wherein the jaws are symmetrical in design.

5. The method of claim 1, wherein the jaw accommodates connectors of the same length.

6. The method of claim 1, wherein the jaw accommodates connectors of different lengths.

7. The method of claim 1, wherein the jaw includes a countersunk surface.

8. The method of claim 1, wherein the jaw includes a counterbored surface.

9. The method of claim 1 wherein the compression connector tool further includes another handle, wherein the another handle is moveable with respect to the second position and the first position.

* * * * *